Oct. 1, 1946.   R. S. CURRY, JR   2,408,411
ERECTING MEANS FOR GYRO VERTICAL INSTRUMENTS
Original Filed June 29, 1942
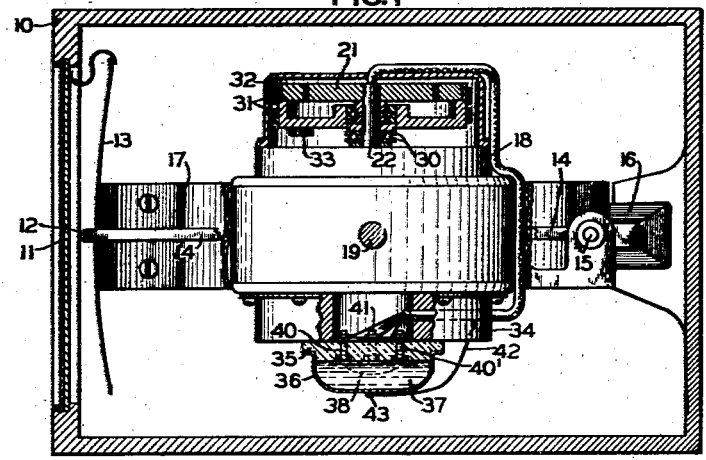
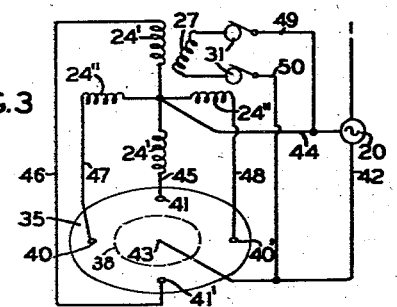
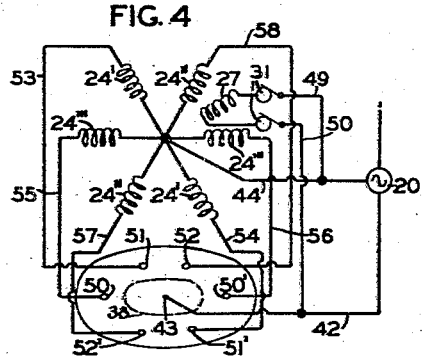
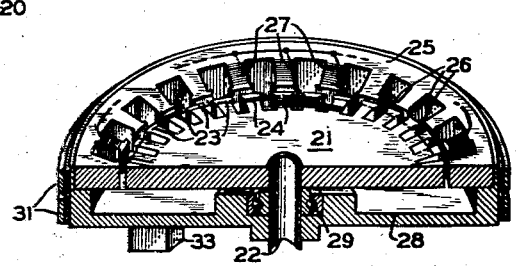
INVENTOR
ROBERT S. CURRY, JR.
BY Herbert H. Thompson
ATTORNEY Patented Oct. 1, 1946

2,408,411

UNITED STATES PATENT OFFICE 2,408,411

ERECTING MEANS FOR GYRO VERTICAL INSTRUMENTS

Robert S. Curry, Jr., Baldwin, N. Y., assignor to Sperry Gyroscope Company, Inc., a corporation of New York Continuation of application Serial No. 448,980, June 29, 1942. This application August 16, 1944, Serial No. 549,712

17 Claims. (Cl. 74—5)

This invention relates generally to gyro vertical or gyro artificial horizon instruments and particularly concerns a controller by which the bearing case of the instrument is erected, upon tilt, in a direct path so that the spin axis of the gyro rotor is maintained vertical with a minimum of conical oscillation. The present application is a continuation of parent application Serial No. 448,980, filed June 29, 1942.

One of the features of the present invention consists in the provision of a novel type of erecting means for such an instrument in the form of a repeater motor which is mounted on the gyro rotor bearing case and positions an eccentric mass about the normally vertical axis of the instrument so that it is positioned upon tilt approximately 90 degrees from the low side of the gyro casing.

To so position the motor, I employ a gravitationally responsive liquid level switch for exciting the repeater motor coils properly to achieve the above result.

Other features and structural details of the invention will be apparent from the following description when read in connection with the accompanying drawing wherein:

Fig. 1 is a side elevation assembly view with parts in section showing an erecting controller constructed in accordance with the present invention embodied for use in a gyro vertical instrument of the artificial horizon indicating type.

Fig. 2 is an enlarged perspective view showing the detail structure of a half section of the improved motive controlled erecting means.

Fig. 3 is a schematic view and wiring diagram showing a desirable electrical arrangement of the parts of the erecting controller, and Fig. 4 is a view similar to Fig. 3 illustrating the electrical arrangement of the parts for a modified form of controller.

With reference particularly to Fig. 1, the gyro vertical instrument with which the present motive controlled erecting means is illustratively depicted is shown of conventional form. In the present instance, the conventional type of gyro vertical instrument shown in the drawing provides the stabilizing means for an artificial horizon indicating type of gyro controlled device, although it will be understood that such usage of the invention is illustrative of a single practical embodiment of the same. As shown, such a device is constructed to include an outer casing 10 having a front window 11 through which the observer views the position of horizon reference bar 12 with respect to a mask element 13 and a suitable lubber line indication (not shown) which may be provided on the window 11 of the device. The horizon reference indication or bar 12 for this conventional type of gyro controlled device is of usual form, the same including a long arm 14 which is pivotally mounted at 15 on the gimbal ring support for the gyro vertical instrument. Arm 14 is counterbalanced about its pivot 15 by means of the counter weight 16. Movement of the arm 14 and consequently the reference bar 12 is effected by a suitable linkage arrangement (not shown) which connects the same to the rotor bearing case of the gyro vertical.

The conventional type of gyro vertical instrument shown in the drawing includes a universal mounting provided in this instance by the casing 10 which provides fore and aft positioned bearings (not shown), with respect to the craft on which the instrument is mounted, which receive the trunnions of a gimbal ring 17 so that the same is confined to movement about a normally horizontal axis. The mask element 13 and pivot 15 for the horizon bar 12 are situated on this ring in the usual fashion. The gyro rotor bearing case 18 of the instrument is also mounted in a conventional way in the gimbal ring by means of further suitable bearings (not shown) situated in the ring and athwartship extending trunnions, with reference to the craft, one of which is indicated at 19 in the drawing. The athwartship defined axis of the rotor bearing case 18 is normally horizontal and is situated in perpendicular relation to the fore and aft located axis of the gimbal ring 17, the gyro rotor bearing case 18 consequently being universally supported within the outer casing 10. The gyro rotor (not shown) is situated within the rotor bearing case in a suitable manner, the same spinning about a nominally vertical axis. When the case 18 tilts about one or both its axes of universal support, the spin axis of the gyro rotor of the instrument correspondingly inclines frm a normally vertical or erected position. The controller of the present invention hereinafter described provides for the maintainence of such position by the directed application of a torque about one of the axes of the universal support of the instrument. The gyro rotor may be spun pneumatically, electrically or in any other desired manner, although in the instant case I prefer to employ an electrically driven rotor which may be of conventional construction and is supplied by a suitable source of three phase alternating current electrical energy such as indicated at 20, in Figs. 3 and 4. Such energy is led to the rotor bearing case 18 of the instrument by way of suitable slip rings (not shown) at the axis of the vase 18 and axis of the ring 17 from the exterior of the outer casing 10.

With reference also to Figs 2, 3 and 4. the motive controlled erecting means of the present invention is shown to include an electric motor of the repeater or positional type, comprising a stator 21 which is mounted on the rotor bearing case by means of a hollow vertically extending post 22. The lower end of post 22 is suitably fixed in position in the top wall of the gyro rotor bearing case. The stator 21 of the motor may include a plurality of circumferentially located poles 23, each of which is provided with a radially extending core, in this instance. The stator is wound in polyphase fashion, the windings of the same being indicated at 24. As shown in Fig. 3, a two phase type of stator winding is utilized whose respective windings 24' and 24" are arranged in 90° angular spaced electrical relation. With this type of stator in which corresponding groups or pairs of such windings are employed, it will be understood that when both sets of windings are energized there will be no resultant magnetic field produced by the stator to effect movement of the electrical rotor of the controlling motor. Fig. 4 shows an alternative form of winding for the stator 21 in which the same is wound in three phase fashion having corresponding groups of windings 24', 24" and 24''' arranged in 60° angular spaced electrical relation. Also, in this alternative form of the invention there is no magnetic field produced when the windings are all energized to move the rotor.

The rotor of the erection controlling means is designated at 25, the same in this instance surrounding the stator 21 and being formed to include a plurality of inwardly extending poles 26 and corresponding core elements. The rotor 25 is a single phase wound type, the winding for the same being indicated at 27. Suitable means are provided for mounting the rotor for movement about an axis defined by the post 22 which axis is also coincident with the spin axis of the gyro rotor contained within the gyro rotor bearing case 18. As shown, such mounting means includes a base forming holding plate 28, bearing 29 and thrust bearing 30, Fig. 1. The circumferential surface of the plate 28 is also provided with slip rings 31 by which energy is supplied the same by way of suitable brushes (not shown) mounted on a cover member 32 which encloses the motor construction. The cover member 32 is, in this instance, suitably fixed to the top of the gyro rotor bearing case 18. An unbalancing mass 33 is situated on the rotor plate 28 which is angularly positioned in the operation of the controller so that the weight of the same is effective to exert a torque about one of the axes of universal mounting of the gyro rotor bearing case to restore the spin axis of the gyro rotor to its normally vertical position, it being understood that such torque is exerted in the proper direction to correct the tilted condition of the case.

In order to selectively energize different windings of the stator 21 and thereby obtain a directing field which combines with the field of the rotor 25 to move the rotor so that the unbalancing mass 33 on the same is properly positioned, I employ a vertical reference maintaining switching means which is gravitationally controlled. Such switching means, as shown, is constructed in the form of a liquid level controlling type of switch which is mounted on the bottom of the gyro rotor bearing case 18 by means of the fixed connecting member 34. The switch proper is formed of a disc shaped top portion 35 constructed of a suitable insulating material such as porcelain and includes a current conducting spherically-shaped bottom portion 36 which is fixed to the cover. The chamber provided between the respective parts is filled with a current conducting fluid 37 except for a bubble 38 which moves over the inwardly disposed face of the cover 35 when the case 18 tilts. When the instrument is properly erected, it will be understood that the bubble 38 is centrally situated with respect to the face of the disc-shaped cover 35 which it contacts. Reference is made to the copending application of Muma, Wilson and Haskins, Serial No. 495,298 filed July 19, 1943, for Liquid level switches for a more detailed description of this considered type of switch.

With reference to Fig. 3, the switch provided for operation with the two phase type of controller constructed in accordance with the present invention includes a pair of oppositely disposed contacts 40—40' situated in parallel relation in the switch with respect to the axis of the gimbal ring 17 or fore and aft axes of the craft. A second pair of contacts 41—41' are arranged in the switch to be correspondingly related to the axis of the rotor bearing case 18 or athwartship axis of the craft.

The circuit connections for the type of erecting means shown in Fig. 2, may be tapped from two of the leads supplying three-phase electrical energy to spin the gyro rotor if such an arrangement is employed, and may include lead 42 from the source to the common contact 43 for the five-contact type of switch shown in this instance. Lead 44 which is another lead to the source of energy supplies energy directly to the stator furnishing the same to both the pairs or sets of windings 24'—24' and 24"—24". Leads 45 and 46 are respectively connected to athwartship located switch contacts 41 and 41'. The other windings 24"—24" are connected to switch contacts 40—40' by way of leads 47 and 48 respectively. A continuous flow of energy is supplied the winding 27 of the rotor from the source by way of leads 49 and 50 through the slip rings 31.

In operation of the erecting controller, it will be understood that when the case 18 tilts so that the spin axis of the gyro rotor departs from a vertical position, the switching means is operable to effect selective energization of the respective two-phase type windings of the controlling motor, such that the unbalanced mass is positioned 90 degrees from the low side of the gyroscope. For example, if the case 18 tilts because of movement of the gimbal ring 17, the bubble 38 (Fig. 3) moves in an upward or downward direction as viewed in this figure and opens, or partially opens, the normally closed switch by uncovering, partially or wholly, either contact 41 or 41'. This opens the circuit through windings 24'—24' of the two-phase stator, or lessens the current flowing therethrough, and the field of the remaining energized windings 24"—24" is then effective to move the unbalanced rotor 25 to the position above indicated, in which the mass 33 is enabled to exert a torque that corrects the tilt of the case in a straight line and without setting up conical oscillation.

Similar operation of the controller is obtained from the three-phase wound type stator shown in Fig. 4. In this instance, it is necessary to employ a liquid level type switch having seven contacts, the common contact being indicated at 43'. The other contacts are designated at 50—50', 51—51', and 52—52'. Paired windings 24'—24' are connected to contacts 51—51' by way of leads 53 and 54. The fore and aft situated contacts 50—50' are connected to windings 24'''—24''' by means of leads 55 and 56. Also leads 57 and 58 connect the paired windings 24"—24" to contacts 52'—52. It will be understood that the six selective contacts 50—50', 51—51', and 52—52' are situated in equidistantly spaced relation from one another and from the center of the face of the top portion 35 of the switch. Also, in this form of the invention one or two of the windings may be rendered ineffective by the switch. It will also be appreciated that the improved controller is equally effective in operation by an electrical repeater motor of direct current design and the same may be employed without departing from the herein disclosed invention. It is also apparent that the motor may be controlled by a selective type switch of the character shown that operates to make instead of break the circuit to the stator windings.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Erecting means for gyro vertical instruments having a gyro rotor bearing case comprising a motor mounted on the case, having a polyphase wound type stator and a gravitationally unbalanced, single phase wound type rotor, a source of electrical energy for said motor, and a vertical reference maintaining switching means responsive to tilt of the case for effecting selective energization of the windings of said polyphase wound type stator to move said gravitationally unbalanced rotor to a position in which the same is effective to exert a tilt correcting torque on the instrument.

2. Erecting means for gyro vertical instruments, as claimed in claim 1, in which the stator is two-phase wound.

3. Erecting means for gyro vertical instruments, as claimed in claim 1, in which the stator is three-phase wound.

4. Erecting means for gyro vertical instruments, as claimed in claim 1, in which the switching means is gravitationally controlled.

5. Means for maintaining the spin axis of the gyro rotor of a gyro vertical instrument in a normally erected position comprising the combination of, a universally mounted gyro rotor bearing case, an erecting controller in the form of a motor, mounted on said case, having a polyphase wound type stator and a gravitationally unbalanced, single phase wound type rotor movable about an axis coincident with the spin axis of the gyro rotor, a source of electrical energy for said motor, and gravitationally operative switching means mounted on and responsive to tilt of the case for effecting selective energization of the windings of said polyphase wound type stator to move said gravitationally unbalanced rotor to an angular position in which the weight of the same is effective to exert a torque to correct the tilt.

6. Means of the character claimed in claim 5, in which the stator is two-phase wound and the switching means is provided by a liquid level controlling type switch having five contacts.

7. Means of the character claimed in claim 5, in which the stator is three-phase wound and the switching means is provided by a liquid level controlling type switch having seven contacts.

8. Erecting means for artificial horizon type gyro vertical instruments comprising the combination of an outer casing, a gimbal ring supported in said casing for movement about a horizontal axis, a gyro rotor bearing case supported in said ring for movement about a normally horizontal axis perpendicular to the axis of the ring, a gyro rotor supported in said case for spinning about a normally vertical axis, a repeater motor for maintaining vertical erection of the spin axis of the gyro rotor including a multi-wound stator and a gravitationally unbalanced rotor, said motor being mounted in the case with the axis of the rotor coincident with the spin axis of the gyro rotor, and gravitationally operative switching means responsive to tilt of the case about its axes of support for effecting selective energization of the windings of said stator to move said gravitationally unbalanced rotor to an angular position in which the weight of the same is effective to exert a torque about a horizontal axis substantially normal to the axis of the tilt.

9. Erecting means of the character claimed in claim 8, in which the stator is two-phase wound and the switching means is provided by a liquid level controlling type switch having one common contact and two oppositely disposed pairs of selective contacts.

10. Erecting means of the character claimed in claim 8, in which the stator is three-phase wound and the switching means is provided by a liquid level controlling type switch having one common contact and three oppositely disposed pairs of selective contacts.

11. A gyro rotor bearing case having an erecting controller mounted thereon in the form of a motor having a polyphase wound type stator and a gravitationally unbalanced, single phase wound type rotor movable about an axis coincident with the spin axis of the gyro rotor.

12. A gyro rotor bearing case of the character claimed in claim 11, in which the stator is two-phase wound.

13. A gyro rotor bearing case of the character claimed in claim 11, in which the stator is three-phase wound.

14. A gyro rotor bearing case of the character claimed in claim 11, which includes thereon a controlling switch of the liquid level type.

15. A gyro rotor bearing case of the character claimed in claim 11, in which the stator is two-phase wound, and which includes thereon a controlling switch of the liquid level type having one common contact and two oppositely disposed pairs of selective contacts.

16. A gyro rotor bearing case of the character claimed in claim 11, in which the stator is three-phase wound, and which includes thereon a controlling switch of the liquid level type having one common contact and three oppositely disposed pairs of selective contacts.

17. Erecting means for gyro-vertical instruments having a rotor bearing case, comprising a repeater motor mounted on said case having a multi-wound stator and a gravitationally unbalanced rotor mounted for turning about a vertical axis on said case, a gravitationally responsive switching means responsive to relative tilt of said casing and means for effecting selective energization of the windings of said stator, and so connected thereto as to move said gravitationally unbalanced rotor to a position in which the center of gravity thereof lies substantially 90 degrees from the low side of the gyroscope.

ROBERT S. CURRY, Jr.